(No Model.)  4 Sheets—Sheet 1.
F. B. TAIT & J. GROSS.
COMBINED CHECK ROWER AND CORN PLANTER.
No. 287,976.  Patented Nov. 6, 1883.
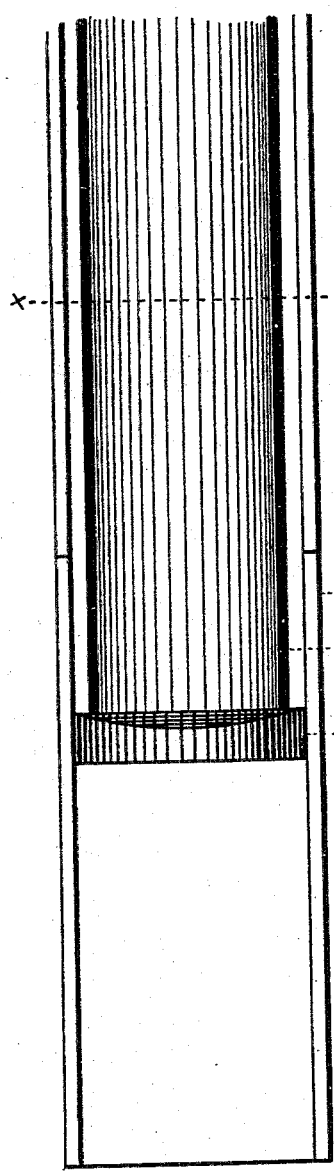
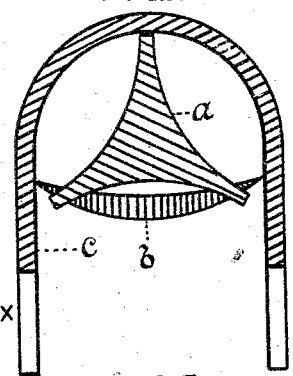
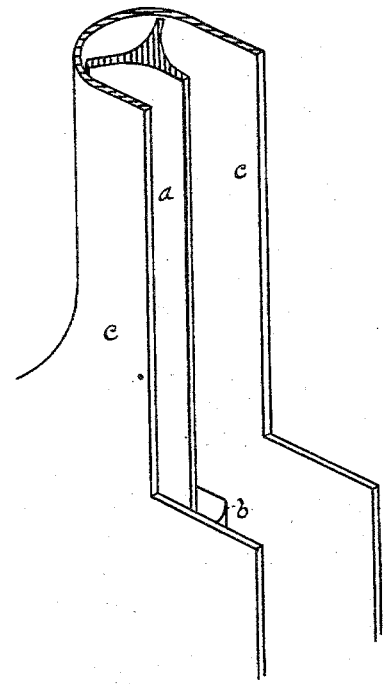
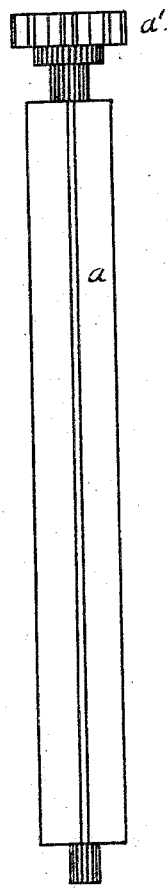
Witnesses
Frank Remley
J D Walker
Inventors
Felix B. Tait
John Gross
By L. P. Graham atty (No Model.) 4 Sheets—Sheet 2.
F. B. TAIT & J. GROSS.
COMBINED CHECK ROWER AND CORN PLANTER.
No. 287,976. Patented Nov. 6, 1883.
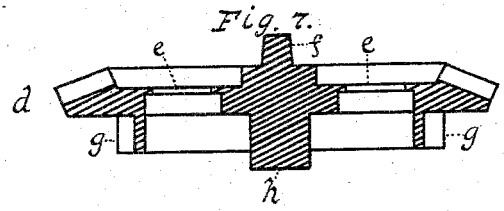
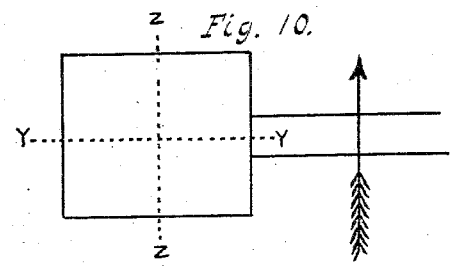
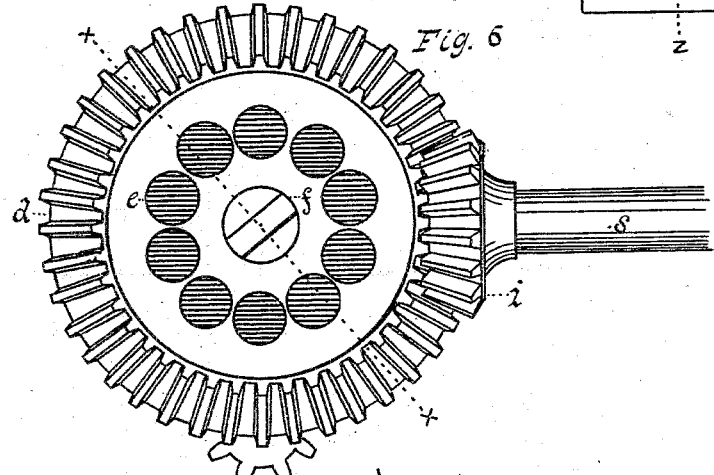
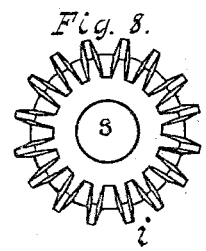
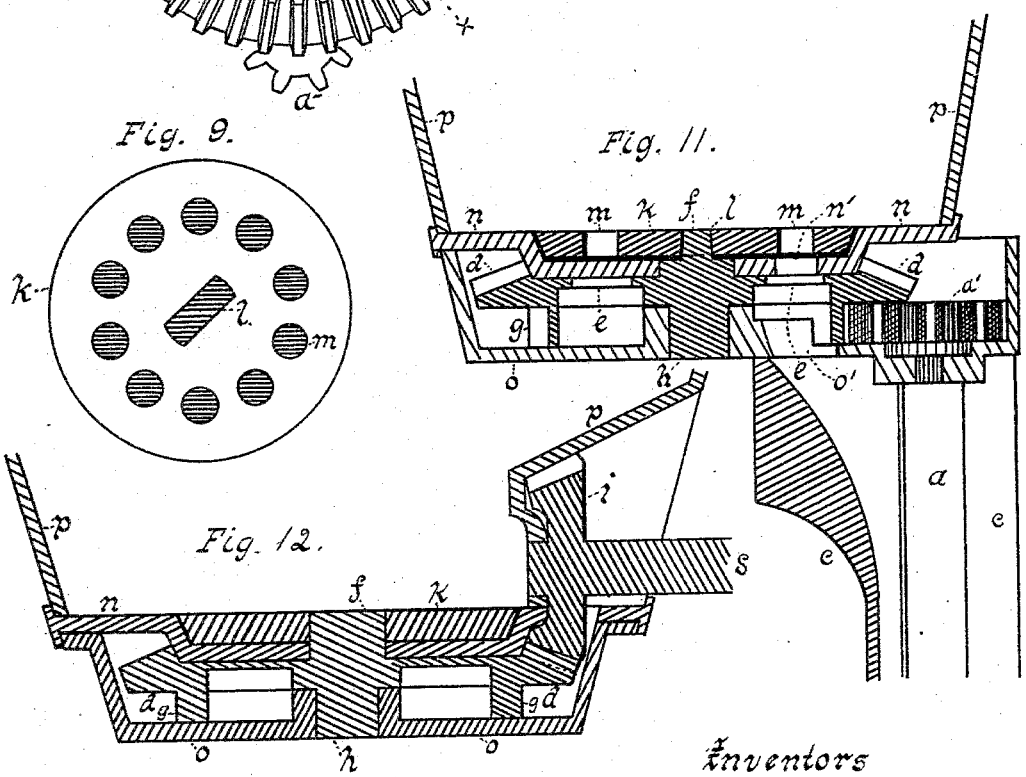
Witnesses
Frank Remley
J. D. Walker
Inventors
Felix B. Tait
John Gross
By L. P. Graham
atty.
N. PETERS, Photo-Lithographer, Washington, D. C.

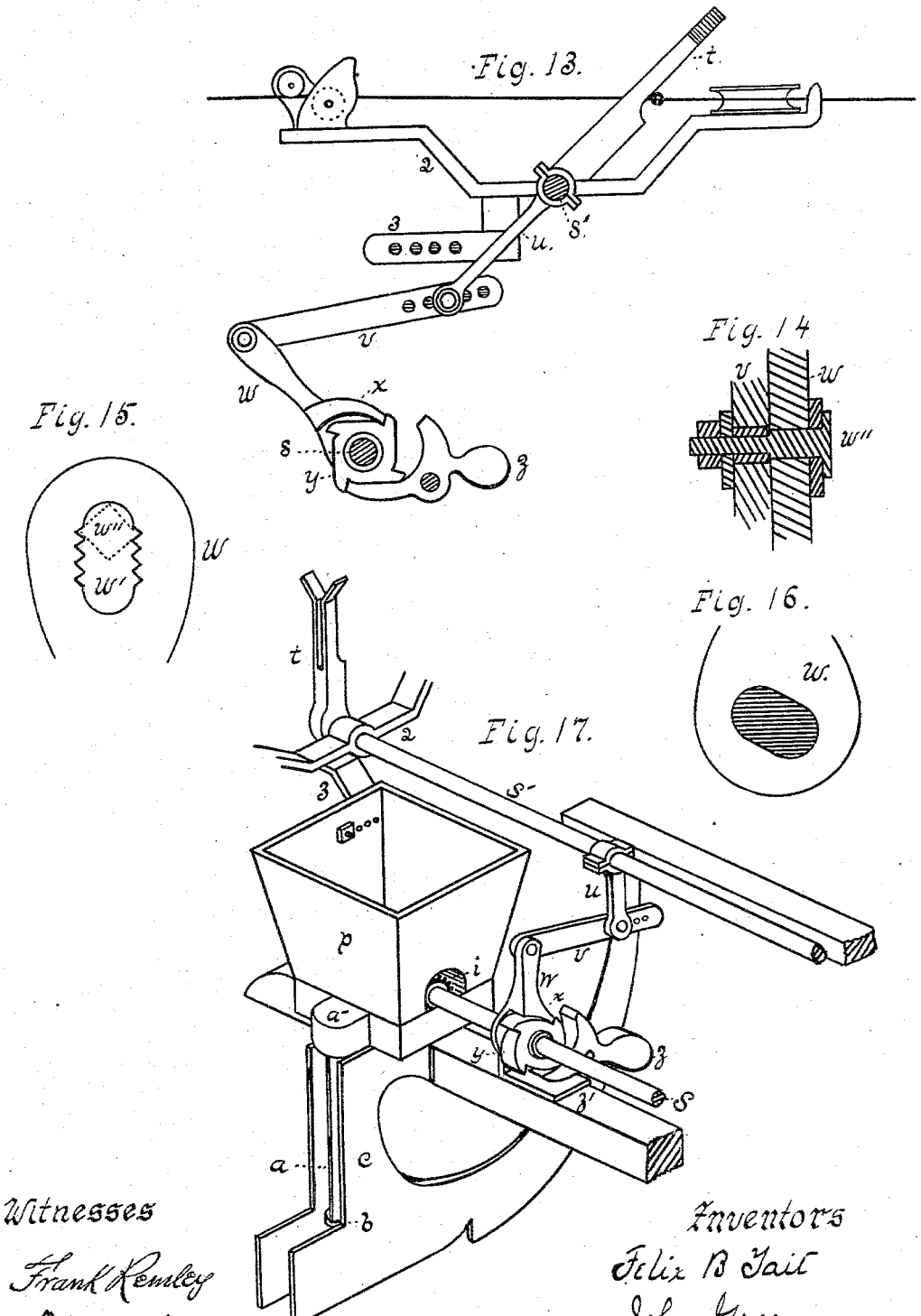

(No Model.) 4 Sheets—Sheet 4.
F. B. TAIT & J. GROSS.
COMBINED CHECK ROWER AND CORN PLANTER.
No. 287,976. Patented Nov. 6, 1883.
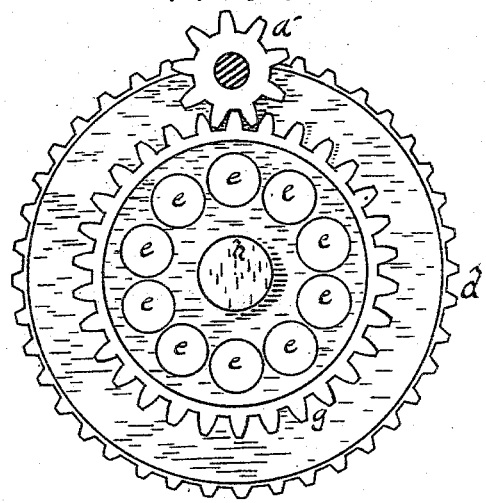

UNITED STATES PATENT OFFICE.

FELIX B. TAIT AND JOHN GROSS, OF DECATUR, ILLINOIS.

COMBINED CHECK-ROWER AND CORN-PLANTER.

SPECIFICATION forming part of Letters Patent No. 287,976, dated November 6, 1883.

Application filed March 2, 1883. (No model.)

*To all whom it may concern:*

Be it known that we, FELIX B. TAIT and JOHN GROSS, residents of the city of Decatur and State of Illinois, have invented certain new and useful Improvements in a Combined Check-Rower and Corn-Planter, of which the following is a specification.

The principal object of our invention is to overcome the imperfection, general with corn-planters, of dropping the grains so close together that the roots of the individual stalks are unable to branch out independently, but must share in common the nourishment of the contiguous soil, while the stalks, compelled to ramify from a point, present a surface to the wind and other influences far greater in proportion than the area of their combined roots. This imperfection is caused by the dropping mechanism of the various corn-planters being so constructed that the grains that constitute a hill are gathered into the smallest possible space, carried very near the ground, and discharged vertically in their compact condition. As will be readily seen, there can be but one result following this method, as the grains cannot scatter while traversing the short distance from the second drop to the ground. Having become satisfied by actual experiment that the proper disposing of the grains in a hill was a matter of serious importance, we invented a second drop, that may be described as a "limited broadcast" drop, in which the grains are radially discharged from a supporting-platform in a horizontal direction by means of a series of wings, which, with a partial casing, also form a receptacle for the corn, while the planter is passing from one hill to another.

Our invention further consists in a horizontally-rotating auxiliary drop-plate provided with a bevel-gear on its upper outer face, by means of which it is rotated; provided with a crown-gear on the lower face, that operates the second drop; provided with a central upward projection oblong in horizontal outline, that rotates the drop-plate, and provided with a series of perforations that conform in number and position to the perforations of the drop-plate.

Our invention further consists, in a check-row shaft formed to oscillate by a forward throw, of a check-row stop and an automatic return, together with a corn-planter shaft in which intermittent rotary motion may be produced by means of a ratchet-wheel rigid on the corn-planter shaft, a pawl-lever provided with a loose bearing on the same, an arm rigid on the check-row shaft, and a rod that connects the arm of the check-row shaft with the pawl-lever of the planter-shaft, said shafts describing parallel lines transversely with the planter.

Our invention further consists in the devices used to connect the check-row shaft with the planter and the check-row arm with the pawl-lever of the planter-shaft, by means of which the position of the check-row shaft may be horizontally adjusted with relation to the corn-planter drop for the purpose of neutralizing the irregularities in planting caused by using variously paced teams.

Our invention further consists in the serrated slot and partially-squared bolt that is used to adjust the length of the pawl-lever.

In the drawings accompanying and forming a part of this specification, Figure 1 is a rear elevation of the lower portion of a seed-tube, showing the vertical arrangement of our second drop. Fig. 2 is a section of Fig. 1 on dotted line $x$, showing the horizontal arrangement of the same. Fig. 3 is an isometrical perspective representation of a section of our second drop, showing the relation between the vertical shaft, the partial casing, and the horizontal platform when in a position to act as a receptacle for the corn. Fig. 4 is a parallel perspective representation of a section of the vertical shaft, showing its position on the horizontal platform after a drop has been effected. Fig. 5 is a plan and elevation of the vertical shaft, showing the gear-wheel by which it is rotated. Fig. 6 is a plan of our horizontally-rotating auxiliary drop-plate geared with and operated by a vertically-rotating pinion on the end of a shaft that lies transversely across the planter, provided with an oblong projection that propels the drop-plate proper, and also provided on its lower surface with a toothed wheel that operates the second drop. Fig. 7 is a vertical section of the auxiliary drop-plate on dotted lines $x$ in Fig. 6. Fig. 8 is an end view of the pinion that operates the auxiliary drop-plate. Fig. 9 is a plan of the drop-plate, showing the oblong opening that fits on the before-mentioned projection on the auxiliary drop-plate. Fig. 10 is a plan of a corn-planter seed-box. Fig. 11 is a vertical section of the first drop device on dotted line $z$ of Fig. 10. Fig. 12 is also a vertical section of the first drop device on dotted line $y$ in Fig. 10. Fig. 13 is a side elevation of the device used to produce intermittent rotary motion in the corn-planter shaft, said corn-planter shaft and the shaft of the check-rower showing in section. Figs. 14, 15, and 16 show details in the construction of Fig. 13. Fig. 17 is a perspective view of one side of our combined check-rower and corn-planter, showing the disposition of the various parts. Fig. 18 is a bottom view of the auxiliary drop-plate, showing its connection with pinion $a'$.

$a$ is a vertical winged or fluted shaft, partially incased by $c$, supported by horizontal plate $b$, and rotated by pinion $a'$.

$d$ is the auxiliary drop-plate, provided with openings $e$, oblong elevation $f$, and cog-gear $g$, pivoted at $h$ and rotated by pinion $i$.

$k$ is the drop-plate, provided with circular openings $m$ and oblong openings $l$.

$n$ is the bottom of the seed-box, depressed to receive the drop-plate, and provided with an opening, $n'$, located directly under the cut-off. (Not shown.)

$o$ is the bottom casing of the first drop device, provided with opening $o'$.

$p\ p$ are the sides of the seed-box, formed, as indicated in Fig. 12, to hold pinion $i$ in contact with the auxiliary drop-plate.

$s$ is the shaft of the corn-planter, and $s'$ the the check-rower shaft.

$t$ is the check-row tappet.

$u$ is an arm rigid on shaft $s'$.

$w$ is a pawl-lever that oscillates on shaft $s$, and produces, through ratchet-wheel $y$, an intermittent rotary motion therein.

$z$ is a locking-pawl that co-operates with $w$ and $y$ to lock the corn-planter shaft.

$v$ is a bar that connects $u$ and $w$.

$x$ is the pawl on lever $w$.

$z'$ is a plate that supports lever $w$ laterally on the side opposing the ratchet, and also furnishes a bearing for pawl $z$.

2 is the frame that supports the check-row shaft.

3 is a bar that connects 2 with the seed-box $h$.

Fig. 15 shows the manner of connecting $w$ and $v$, and Fig. 14 further illustrates the connection by a sectional view.

$w'$ is a slot in $w$, having substantially the conformation shown in Fig. 15.

$w''$ is the bolt used to make the connection.

Fig. 16 shows a slot in $w$ that permits pawl $x$ to rise over the teeth of ratchet-wheel $y$. Tappet $t$ is thrown in one direction by the stop on the check-row wire and returned automatically by a spring or weight. A stroke of the tappet produces a one-fourth revolution in the corn-planter shaft, a one-tenth revolution in the auxiliary drop-plate, and a one-third revolution in the shaft of the second drop. Shaft $s'$, arm $u$, bar $v$, lever $w$, ratchet $y$, shaft $s$, plate $d$, gear $g$, and pinion $a'$ convey the motion of tappet $t$ to the second drop, $a$, in the order given.

The object of the connecting device shown in Figs. 14 and 15 is to accurately adjust the throw of lever $w$ by lengthening or shortening the same. The details of said device consist in the serrated slot shown in Fig. 15, and in a bolt having the part that extends through $w$ formed square in section, while the part that extends through $v$ is round, threaded, and provided with a ferrule.

In operation the square corners are placed in opposing serrations of the slot. Bar $v$, with its ferrule, is placed on the round portion of said bolt, and the whole secured by a suitable nut. As the position of the corn dropped by the planter is affected by the speed of the team, we construct the check-row device adjustable with relation to corn-planter. The adjustability above mentioned lies in the construction of support 3 and bar $v$, which are each provided with a series of holes that permit the check-rower to be attached to the corn-planter in various positions more or less in advance of the same. With the check-row device in such a position that a slow-walking team will drop the corn in check-rows, a fast-walking team will carry said corn slightly past the correct point, and this slight variation will be doubled as the planter returns, making the same deviation in an opposite direction. To overcome this defect, the position of the check-rower is advanced with reference to the corn-planter by means of the adjusting-holes in 3 and $v$. With the auxiliary drop-plate in the position indicated in Fig. 11, the corn passes through $m$, $n'$, $e$, and $o'$ and falls on platform $b$, where it is held by the projections of $a$ until a stroke of the tappet produces a one-third revolution therein and forces the corn from said platform in a horizontally-radiating direction to a distance regulated by the diameter of the shaft. The projections on shaft $a$, besides operating as a limited broadcast drop, also co-operate with their partial casing $c$ to form a receptacle for the corn while the planter is passing from one hill to another.

We claim—

1. A limited broadcast second drop for corn-planters, consisting in a partially-incased intermittently-rotating winged or fluted approximately vertical shaft, constructed and arranged to operate substantially as and for the purpose herein set forth.

2. The combination, in a limited broadcast second drop for corn-planters in which the corn is discharged radially in a horizontal direction, of a horizontal platform, $b$, a series of vertical wings, $a$, and a partial casing, $c$, substantially as shown and described.

3. A horizontal intermittently-rotating perforated drop-plate, $d$, provided with a power-receiving bevel-gear on its upper outer face and a power-transmitting crown-gear on its lower face, in combination with a driver-pinion, $i$, and a driven pinion, $a'$, all constructed and arranged to receive motion from a check-row device and transmit the same to the second drop of the corn-planter, substantially as shown and described.

4. The combination, in a combined check-rower and corn-planter, of oscillating shaft $s'$, tappet $t$, arm $u$, rod $v$, and pawl-lever $w$ with ratchet $y$, lock-pawl $z$, and shaft $s$, by means of which intermittently-rotating motion may be imparted to said shaft $s$, substantially as herein set forth.

5. The combination, in a combined check-rower and corn-planter, of an oscillating tappet and shaft, $t\ s'$, an intermittently-rotating shaft and pinion, $s\ i$, and an intermittently-rotating drop, $d\ k$, said shafts being provided with a suitable arrangement of ratchets and levers, by means of which the oscillating motion of the one may be converted into intermittent rotary motion in the other, substantially as herein set forth.

6. The combination, with shaft $s'$, of the variable attaching device shown at 3 $p$ and $u\ v$, by means of which said shaft may be adjusted horizontally with relation to the planter-drop, to conform to the paces of different teams, substantially as herein set forth.

7. The device for regulating the stroke of arm $w$, consisting in the combination of arm $w$, provided with serrated slot $w'$, partially-squared bolt $w''$, and connecting-rod $v$, as and for the purpose set forth.

8. The combination, with pinion $i$ and cogged plate $d$, of box $p$, recessed to receive said pinion and form a covering therefor, substantially as shown and described.

FELIX B. TAIT.
JOHN GROSS.

Attest:
ISAAC D. WALKER,
C. C. CLARK.